United States Patent
Sato

(10) Patent No.: US 6,435,055 B1
(45) Date of Patent: Aug. 20, 2002

(54) DUAL OPERATING SYSTEM FOR CONTROLLING A BRAKE

(76) Inventor: Hiroyuki Sato, 1-1-16, S-Shiroganedai-Bld.5F, Shiroganedai, Minato-ku, Tokyo (JP)

( * ) Notice: Subject to any disclaimer, the term of this patent is extended or adjusted under 35 U.S.C. 154(b) by 0 days.

(21) Appl. No.: 09/597,176

(22) Filed: Jun. 20, 2000

(51) Int. Cl.⁷ .......................... B60K 41/20; G05G 9/02
(52) U.S. Cl. ...................................... 74/481; 74/562.5
(58) Field of Search ...................... 74/481, 482, 562.5, 74/512; 403/100

(56) References Cited

U.S. PATENT DOCUMENTS

| | | | |
|---|---|---|---|
| 2,481,966 A | * 9/1949 | Zivi | 74/481 |
| 2,597,379 A | * 5/1952 | Romel | 74/481 |
| 2,799,181 A | * 7/1957 | Speckman | 74/562.5 |
| 2,814,212 A | * 11/1957 | Garver | 74/562.5 |
| 2,849,890 A | * 9/1958 | Reeser | 74/481 |
| 2,890,597 A | * 6/1959 | Allgaier | 74/562.5 |
| 3,174,359 A | * 3/1965 | Rose | 74/562.5 |
| 3,226,997 A | * 1/1966 | Malloy | 74/482 |
| 3,435,703 A | * 4/1969 | Allgaier | 74/562.5 |
| 3,477,310 A | * 11/1969 | Garcia | 74/562.5 |
| 3,850,048 A | * 11/1974 | Moore | 74/481 X |
| 3,943,795 A | 3/1976 | Kenney | |
| 4,312,246 A | 1/1982 | Barresi | |
| 4,424,723 A | * 1/1984 | Gockel | 74/482 |
| 4,788,879 A | * 12/1988 | Ulrich | 74/481 |
| 4,946,013 A | * 8/1990 | Conlyn, Jr. et al. | 74/482 X |
| 5,119,688 A | * 6/1992 | Snyder, Jr. | 74/482 X |
| 5,129,492 A | * 7/1992 | Lenz et al. | 74/481 X |
| 5,421,217 A | * 6/1995 | Loustaunau | 74/482 |
| 5,709,131 A | * 1/1998 | Gummery | 74/481 |
| 5,765,442 A | * 6/1998 | Judson | 74/481 |

FOREIGN PATENT DOCUMENTS

JP   10-81499   * 3/1998

* cited by examiner

Primary Examiner—Thomas R. Hannon
Assistant Examiner—Colby Hansen
(74) Attorney, Agent, or Firm—Grimes & Battersby, LLP

(57) ABSTRACT

An educational car is provided in which the driver-student is provided with a conventional braking pedal and the passenger-teacher is provided with a braking stick to override the driver-student braking pedal in order to effect a braking operation. Furthermore, there is provided a counter braking function to override the operation of the brake by the driver-student. The counter braking arrangement may need no more additional mechanical structure and the operation of the counter braking stick by a hand is capable of preventing or reversing the operation of the brake by the driver-student.

4 Claims, 4 Drawing Sheets

DUAL OPERATING SYSTEM FOR CONTROLLING A BRAKE

BACKGROUND OF THE INVENTION

1. Field of the Invention

This invention relates to dual operating systems, and, more particularly, to dual operating systems for controlling the braking systems of educational driving cars or the like.

2. Prior Art

Various systems are known for dual operation of functional systems such as braking systems, acceleration systems, clutching systems, and so forth. One particular application of dual operator systems is for the control of braking systems in educational driving cars in which a passenger-teacher instructs a driver-student to drive, and in which, for safety's sake, provision is made for overriding the driver-student operation of the braking system in order to prevent accidents.

Sometimes students will panic and freeze on the brake, and the instructor may have a try to insert his foot under his auxiliary brake pedal to try to reverse the braking operation. This is awkward and time consuming and thus dangerous.

Dual braking mechanisms for motor cars are shown by way of example in U.S. Pat. Nos. 4,312,246; and 3,943,795.

Although none of these patents disclose a type of system as will be discussed hereunder, they do disclose systems wherein a braking apparatus in a car can be operated by a foot only. Also the dual braking mechanisms disclosed in those patents are constructed of many parts, therefor it is expensive to install them on a car and require an automotive specialist.

For example, Barresi, in U.S. Pat. No. 4,312,246, discloses a dual operating system for controlling a brake wherein there is provided a driver-student braking pedal, passenger-teacher braking pedal to override the driver-student braking pedal to effect a braking of a car, and counter braking pedal positioned for operation by the passenger-teacher to prevent or reverse the operation of the driver-student braking pedal by the driver-student.

Frank T. Kenney, in U.S. Pat. No. 3,943,795, discloses a system wherein an auxiliary pedal is supported on a rod through which connection is made to the driver's pedal for purposes of alternate operation of the car brakes when either the driver's pedal or the auxiliary foot pedal is depressed. This system is also a foot operated structure.

SUMMARY OF THE INVENTION

In view of the above situation, it is a primary object of the invention to provide a simple and inexpensive dual operating braking system.

It is another object of the invention to provide a hand operated structure and low cost dual operating system in which an override is provided to one of the operators in order to prevent operation by the other operator.

It is still another object of the invention to provide a simple arrangement by which a passenger-teacher may instruct a driver-student to operate a car while, at the same time, providing for improved safety of operation of the car.

It is yet another object of the invention to provide a simple and low cost mechanical system capable of being detachably installed in a car to provide the aforementioned advantages of operational control.

To attain the above objects, the present invention provides an educational driving car with which a passenger-teacher instructs a driver-student to drive, said car comprising driver-student braking means, passenger-teacher braking means to override the driver-student braking means to effect a braking of said car and to prevent or reverse the operation of the driver-student braking means by the driver-student, and a centrally located hump, the passenger-teacher braking means comprising a stick, a semi-crank section provided over said hump and extending from the end portion of said stick, and a rod extending from the end portion of said semi-crank section, the driver-student braking means including a pedal coupled to said rod so as to be linked to said stick through said semi-crank section, the passenger-teacher braking means being detachably coupled to said pedal of the driver-student braking means.

As a result, this invention can provide a simple and inexpensive dual operating system capable of being detachably installed in a car.

The above and other objectives, features and advantages of the invention will become more apparent from the following description when taken in conjunction with the accompanying drawings.

DESCRIPTION OF THE PREFERRED EMBODIMENTS

In the following, a disclosure will be made of a dual operator system in which one operator may not only override the operation of control by another operator, but also in which operation by one operator can be prevented and even smoothly reversed by the other operator.

While such a system will be described with reference to an educational driving car and while the instant disclosure is directed principally to a driver-student and passenger-teacher type of relationship, it is possible that the invention can be applied as between two operators, such as an aged person and young person or a handicapped person and a non-handicapped person.

In addition to the above, it will be seen below that the invention is shown as being principally applied to a braking system. The invention may also be readily applied to clutching systems and other types of functional systems which may or may not be similar to braking systems involving controls by pedals or other types of manipulative apparatus, be they mechanical, hydraulic, electrical, magnetic, or the like.

Figure 1:
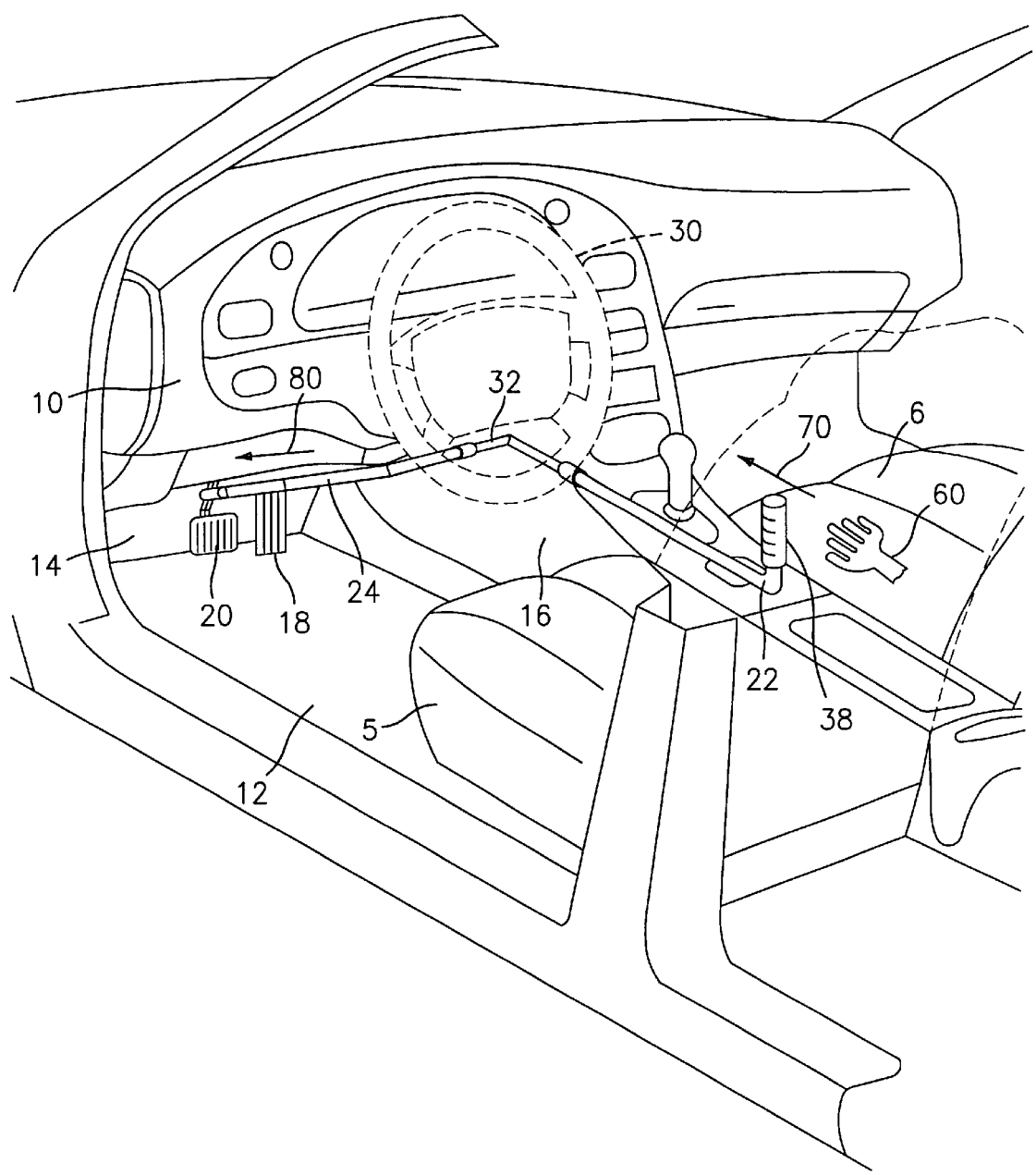
FIG. 1 is a fragmentary view of an educational driving car, illustrating the installation of a braking stick in accordance with the preferred embodiment of the invention.

In FIG. 1 is shown a fragmentary portion of the interior front part of an educational driving car. The portion disclosed includes a dashboard 10, a floor 12, a fire wall 14, and a centrally located hump 16, which is intended for the purpose of accommodating a longitudinally aligned shaft (not shown).

As in any conventional car, there is provided a driver-student seat 5 and a passenger-teacher seat 6.

Also there is provided a gas pedal 18 and brake pedal 20 located in proximity of a steering wheel 30.

Furthermore there is provided a passenger-teacher braking stick 22, the purpose of which is to enable the passenger-teacher to provide a braking operation in the event that the driver-student fails to apply the same, especially with respect to emergency situations in which the driver-student fails to operate or function in a timely fashion, thereby creating an emergency. The braking system construction which actually brakes the car requires no discussion in this specification and a wide variety of such braking systems are well known and are disclosed in great detail elsewhere.

In the specific driver-student and passenger-teacher arrangement illustrated in FIG. 1, the braking stick 22 is constructed and arranged in a direction parallel to the central hump 16 and is able to slide upon it.

The stick 22 is connected to a rod 24 in fixed manner with use of a semi-crank section 32.

Figure 2:
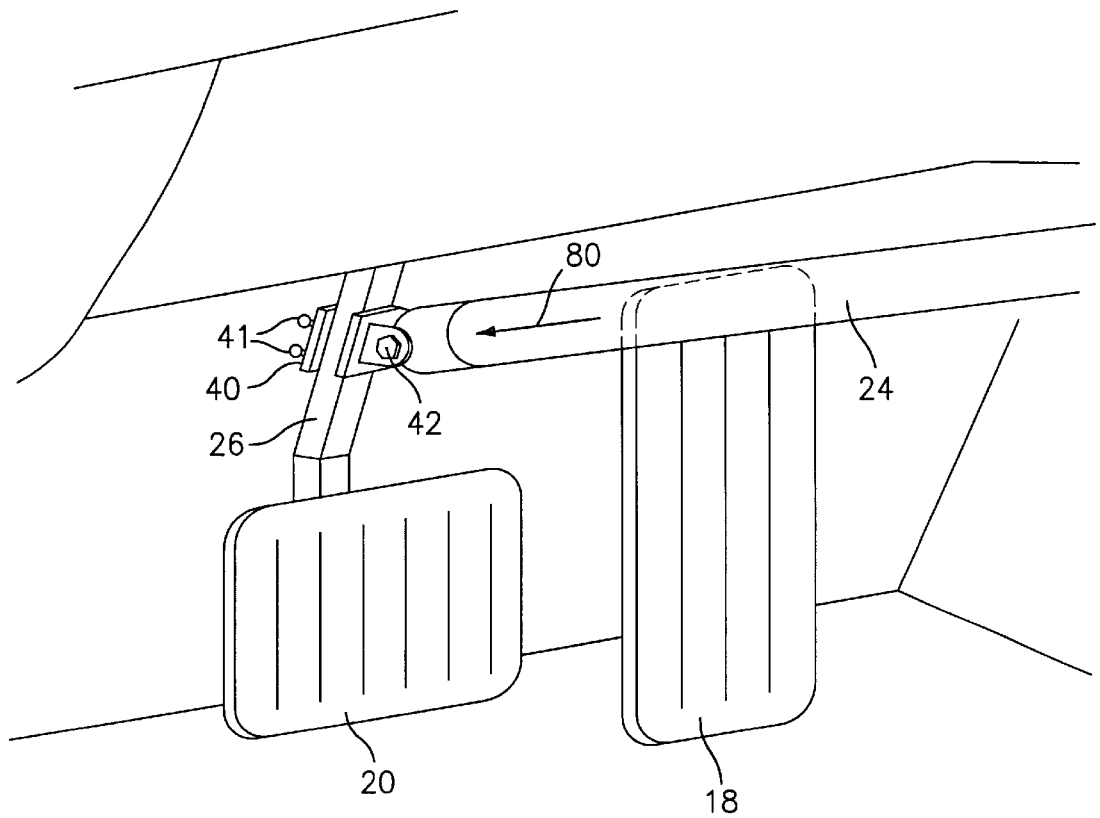
FIG. 2 is a fragmentary view showing, to an enlarged scale, a portion of embodiment illustrated in FIG. 1.

As shown in FIG. 2, the one end of the rod 24 is pivotably connected to a clamp 40 by a pivot 42 which permits both rotational and flexural movement of the rod 24, and a clamp 40 is securely attached to the lever 26 by means of bolts 41.

This arrangement permits the installation of the clamp 40 without doing any permanent damage to the car as might be caused by welding or riveting or installation by the use of metal penetrating screws and bolts 41, as is usually the case. The stick 22 has a grip 38 which is bent in the direction away from the hump 16.

Figure 3:
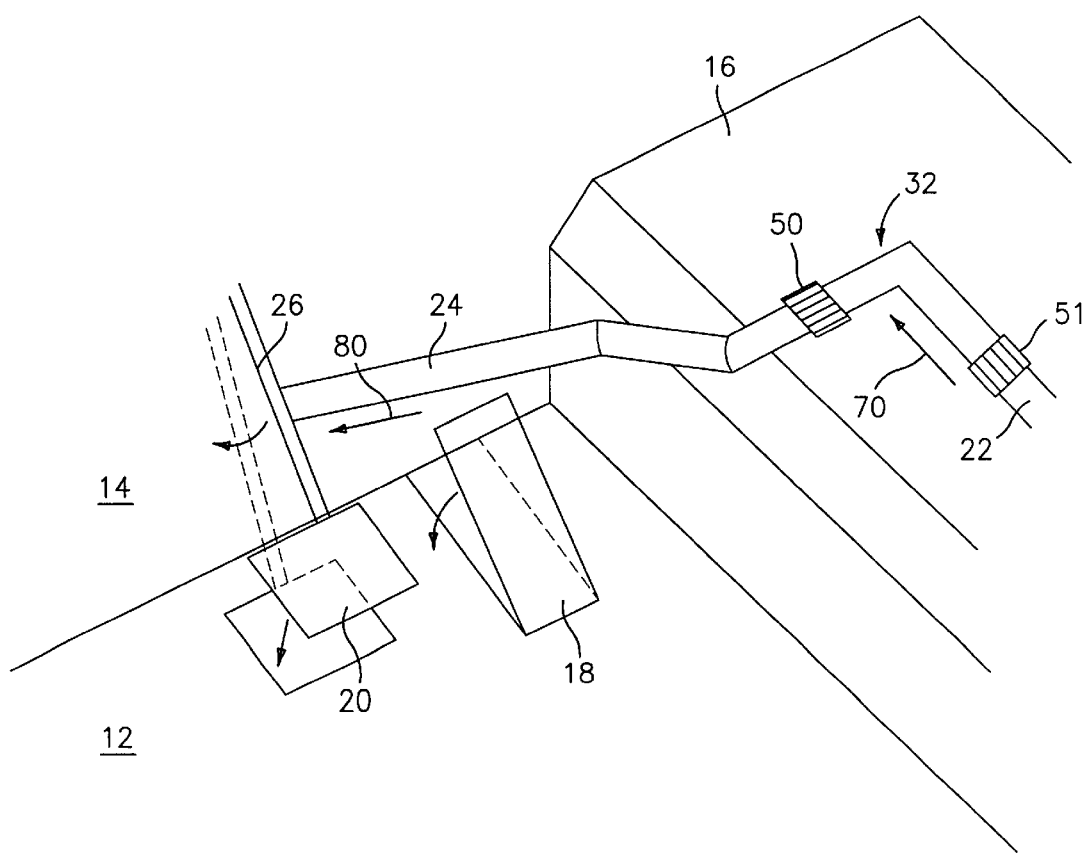
FIG. 3 illustrates the detail of a semi-crank section illustrated in FIG. 1.

As shown in FIG. 3, the semi-crank section 32 which functions merely to permit passage of the stick 22 past the hump 16, thereby accommodating the hump 16 without interfering with operation of the system. The rod 24 crosses over a open space of the gas pedal 18 toward the hump 16.

In FIG. 3 it will be clear that the semi-crank section 32 has extensible adjusters 50, 51 at each end portions respectively, one extensible adjuster 50 is adjusted for the width of the hump 16, the other extensible adjuster 51 is adjusted for the passenger-teacher's convenience.

Figure 4:
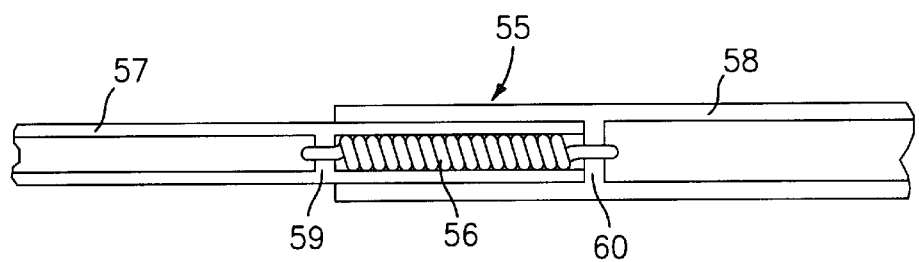
FIG. 4 is a sectional view of an one-way expander.
Figure 5:
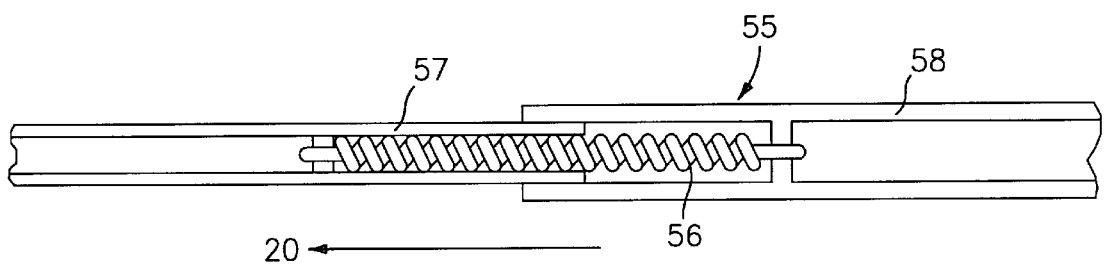
FIG. 5 is a view corresponding to FIG. 4, illustrating a condition of expansion.

The extensible adjusters 50, 51 construction which actually extends the length of a conventional rod require no discussion in this specification and a wide variety of such extensible adjusters 50, 51 are well known and are disclosed in great detail elsewhere For the safety operation of the system, there can be provided a one-way expander 55 in the middle portion of the stick 22 or the rod 24 as shown in FIG. 4 and FIG. 5. The one-way expander 55 is consists of a coil spring 56 and a pair of pipe members 57, 58.

The first pipe member 57 is smaller diameter than the second pipe member 58 so the first pipe member 57 can be inserted into a bore of the second pipe member 58. The coil spring 56 is provided into a bore of the first pipe member 57 and one end of the coil spring 56 is connected to the first pipe member 57 by a stopper portion 59, and another end of the coil spring 56 is connected to the second pipe member 58 by a stopper portion 60.

The first pipe member 57 is located at the side of the braking pedal 20 and the second pipe members 58 is located at the side of the braking stick 22.

The second pipe member 58 can always push the end of the first pipe members 57 by means of a stopper portion 60.

In case the braking stick 22 becomes jammed for some reason, when braking is required a driver-student can press strongly on the braking pedal 20, then the first pipe members 57 can be slid out from the bore of the second pipe member 58 against a force of the coil spring 56.

FIG. 1 illustrates the operation of stick 22 by the hand 60 of an operator (specifically, the passenger-teacher). It is shown that forward operation of stick 22 is effective to displace the semi-crank section 32 and the rod 24 in the direction indicated by arrows 70, 80 respectively.

Movement of the semi-crank section 32 indicated by arrow 70 corresponds to the forward motion indicated by arrow 80 in FIG. 2, thereby providing for an operation by the passenger-teacher in such a manner as to apply operation of the braking pedal 20 in a timely fashion.

The rearward operation of the braking stick 22 is capable of preventing or reversing the operation of the brake by the driver-student.

It will be obvious to those skilled in the art that there are many modifications and variations of the constructions set forth hereinabove. These modifications and variations will not depart from the scope of the invention if defined by the following claims.

What is claimed is:

1. An educational driving car with which a passenger-teacher sitting on one of two seats instructs a driver-student sitting on the other of said two seats to drive, said car comprising driver-student braking means consisting of a brake pedal securely attached to a lever, passenger-teacher braking means to override the driver-student braking means to effect a braking of said car and to prevent or reverse the operation of the driver-student braking means by the driver-student, and a centrally located hump intervening between the floor area in front of the two seats, said hump elevated to accommodate the appurtenant mechanism connecting the vehicle engine, said passenger-teacher braking means comprising a stick, a crank section consisting of a bent portion and a straight portion connected to one end of said stick, said bent portion bent around and over said hump so as to function to permit passage of the bent portion past said hump, and a rod extending from said bent portion of said crank section, said rod coupled to said lever pivotally by the pivot which permits both rotational and flexural movement of said rod so as to link said brake pedal with said stick through said crank section, the passenger-teacher braking means being detachably coupled to said brake pedal of the driver-student braking means.

2. The passenger-teacher braking means as claimed in claim 1 wherein said stick has a grip which is bent at the other end of said stick in the direction away from said hump.

3. The passenger-teacher braking means as claimed in claim 1 wherein said bent portion of said crank section has a length adjuster which is adjustable according to the elevation of said hump.

4. The passenger-teacher braking means as claimed in claim 1 wherein said stick or said rod has on its axial portion a one-way expander which permits the driver-student braking means to operate the braking of said car.

* * * * *